Dec. 23, 1969 J. F. BURGESS ET AL 3,485,630

METHOD OF ETCHING A METAL LAYER COATED WITH A LAYER CONTAINING A PHOTOLYTIC HALOGEN LIBERATOR AND A BLEACHABLE ORGANIC DYE

Filed Jan. 21, 1966

Inventors:
James F. Burgess,
Gordon J. Sewell,
by John M. Davis
Their Attorney.

United States Patent Office 3,485,630
Patented Dec. 23, 1969

3,485,630
METHOD OF ETCHING A METAL LAYER COATED WITH A LAYER CONTAINING A PHOTOLYTIC HALOGEN LIBERATOR AND A BLEACHABLE ORGANIC DYE

James F. Burgess, Schenectady, and Gordon J. Sewell, Albany, N.Y., assignors to General Electric Company, a corporation of New York Filed Jan. 21, 1966, Ser. No. 522,137
Int. Cl. G03c 5/00, 5/16
U.S. Cl. 96—36 9 Claims

ABSTRACT OF THE DISCLOSURE

A recording member and a method of recording are disclosed in which the recording member includes a film of image-forming material having a reactive overlayer incorporating a photolytic agent and a photomasking agent, the photolytic agent producing a substance reacting with the material of the image-forming layer in response to exposure to activating radiation and the photomasking agent being convertible from a masking condition to a nonmasking condition in response to exposure of the layer to converting radiation. The photomasking agent prevents the reaction between the image-forming layer and the photolytic agent during exposure of the layer to converting radiation. With such a member, the recording is made by subjecting the member to converting radiation having a distribution corresponding to the image to be recorded to convert the photomaking agent to a nonmasking condition in point-by-point correspondence with the image to be recorded. The recording member is then exposed uniformly to radiation for activating the photolytic agent to produce the material which reacts with the image-forming layer in accordance with the pattern produced in the photomasking layer.

Figure 1:
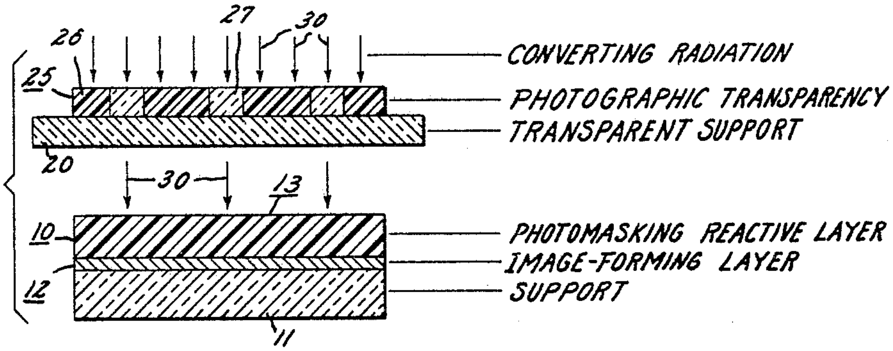

This invention relates to a method and system for producing a predetermined pattern in the surface of a material, such as metal, by the reaction of a photolytic agent therewith in accordance with a predetermined pattern of activating radiation, and to a selectively photosensitive member for use therein.

There is disclosed in the co-pending application of Joseph Gaynor, Ser. No. 275,753, filed Apr. 25, 1963, now Patent No. 3,346,384, granted Oct. 10, 1967, for "Metal Image Formation," and assigned to the assignee of the present invention, a method and system wherein a metal surface is coated with a layer of synthetic organic plastic resin having incorporated therein a photolytic material which upon exposure to a selective pattern of activating radiation for a sufficient time period converts exposed portions of the metal surface to a different chemical composition through reaction with the photolytic material. More specifically, a silver film, for example, is coated with a resin having incorporated therein iodoform which liberates a chemically reactive product upon exposure to light from a tungsten filament lamp, portions of the silver film being converted to silver iodide compounds in areas having a point-by-point correspondence with the incident radiation so that a true reproduction of the radiation pattern is obtained directly upon the silver film due to the reaction of the exposed areas thereof with the photolytically produced reactive product. Depending upon the final use for the selectively reacted silver layer, the resin layer may be completely removed together with the reacted silver iodide compounds to provide a reproduction in the form of a relief image of the pattern of incident radiation. While the described method and system are entirely satisfactory for the intended purpose, the exposure times to obtain significant reaction is of the order of several minutes and even several hours, and throughout this relatively long exposure time, at the high intensities of radiation employed, damage to or destruction of the modulating medium, such as a photographic transparency, may result.

It is a general object of the present invention to provide an improved reproduction method and system of the type set forth wherein the exposure time is materially reduced.

Another object of the invention is to provide an improved reproduction method and a reproduction system for carrying out a reproduction method of the type set forth comprising the steps of providing a film of image-forming material carrying a reactive layer having incorporated therein a photolytic agent and a photomasking agent, the photolytic agent being characterized by reaction with the image-forming material in response to exposure of the layer to activating radiation for the photolytic agent, the photomasking agent being convertible from a masking condition to a non-masking condition in response to exposure of the layer to converting radiation for the photomasking agent and being characterized by the ability when in the masking condition thereof to prevent a reaction between the image-forming material and the photolytic agent during exposure of the layer to the activating radiation, exposing the layer to a selective pattern of the converting radiation to convert the photomasking agent to the nonmasking condition thereof in a corresponding selective design in the layer and in the masking condition thereof in all other areas, and exposing the layer uniformly to the activating radiation to cause the photolytically produced chemically reactive material to react with the image-forming material in the selective design, thereby to reproduce in the film a design determined by the selective pattern of the converting radiation.

Yet another object of the invention is to provide an improved reproduction method and system of the type set forth wherein the photomasking agent normally renders the layer opaque to the activating radiation and is characterized by a reaction to render the layer transparent to the activating radiation after exposure thereof to converting radiation for the photomasking agent.

In connection with the foregoing object, another objection of the invention is to provide a reproduction method and system of the type set forth wherein the photomasking agent is an organic dye which normally renders the layer opaque to the activating radiation and which can be reacted to render the layer transparent to activating radiation upon exposure to a converting radiation, the preferred converting radiation being light from a tungsten filament lamp source and the preferred activating radiation being infrared radiation.

A still further object of the invention is to provide a reproduction method and system of the type set forth and further including the step of fixing the layer containing the photolytic agent and the photomasking agent to render at least the photolytic agent inoperative, thereby to fix and to preserve the reproduced image produced thereby even upon subsequent exposure to the activating radiation.

In connection with the foregoing object, it is another object of the invention to provide a further step in the reproduction method and further processing equipment in the system wherein the layer containing the photolytic agent and the photomasking agent is removed, such as by employing a solvent therefor.

A further object of the invention is to provide a suitable support for the film of image-forming material so that the film will be preserved after removal of the layer, removal of the layer also preferably removing that portion of the reactive material that has reacted with the photolytic agent.

A still further object of the invention is to provide a recording member that is useful in the reproduction method and system set forth above, the reproduction member comprising a film of image-forming material carrying a layer having incorporated therein a photolytic agent and a photomasking agent.

Further features of the invention pertain to the particular arrangement to the steps of the method and the parts of the system and the composition and structure of the reproduction member, whereby the above-outlined and additional operating features thereof are attained.

Figure 2:
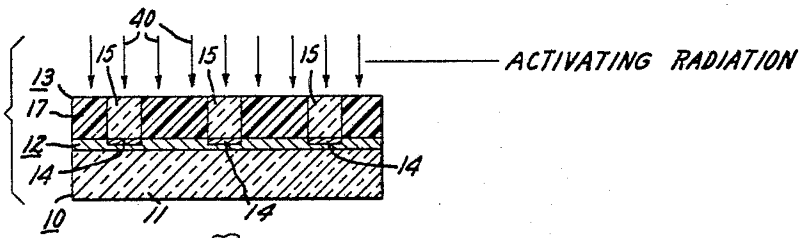
Figure 3:
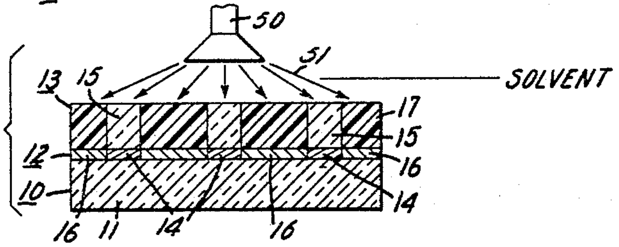
Figure 4:
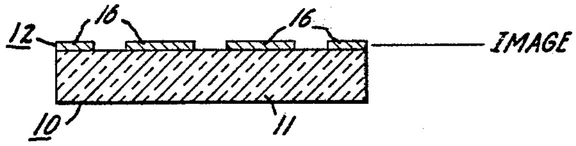

The invention, both as to its organization and method of operation, together with further objects and advantages thereof, will best be understood by reference to the following specification taken in connection with the accompanying drawing which is illustrative of one embodiment of the invention in which:

FIGURE 1 is a diagrammatic view in vertical section through a reproduction member including a support carrying an image-forming film on which is disposed a layer having incorporated therein a photolytic agent and a photomasking agent, there being provided an overlying photographic negative and source of converting radiation for exposing selective areas of the layer of the reproduction member to the converting radiation;

FIGURE 2 is a diagrammatic view of the reproduction member of FIGURE 1 illustrating that certain portions of the upper layer thereof have had the photomasking agent therein bleached to render the layer transparent to the activating radiation, the activating radiation having been illustrated as being uniformly applied to the upper layer;

FIGURE 3 is a diagrammatic view similar to FIGURE 2 and illustrating the reaction of the image-forming film in the areas wherein the upper layer is bleached, and further illustrating the application of a solvent thereto for dissolving the upper layer and the reacted portions of the image-forming film; and FIGURE 4 is a diagrammatic view in vertical section through the finished member bearing the relief image resulting from the reproduction method and system of the present invention.

Referring now to FIGURE 1 of the drawing, there is diagrammatically illustrated a reproduction member 10 including a support 11, a film 12 of image-forming material deposited on the upper surface of the support 11 and carrying in turn on the upper surface thereof a reactive layer 13. As illustrated, the support 11 may be formed of a transparent material such as glass having substantially flat planar and parallel upper and lower surfaces, the image-forming layer 12, for example, of a metal such as tin, being disposed on the upper surface of the support 11. The photoreactive layer 13 may be formed essentially of a synthetic organic plastic resin, such as for example, polystyrene resin, and has incorporated therein a photolytic agent and a photomasking agent. It will be understood that the reactive layer 13 would be transparent but for the presence of the photomasking agent. In one preferred embodiment of the invention, the photolytic agent is a polyhalogenated hydrocarbon such as for example iodoform, and the photomasking agent is an organic dye, such as for example, indophenol blue. Disposed above the reproduction member 10 is a transparent support 20 that carries on the upper surface thereof a photographic negative or transparency 25, the photographic negative 25 having relatively opaque light blocking areas 26 and relatively transparent light transmitting areas 27. In practice, the photographic negative is actually placed as close to the upper surface of the reactive layer 13 as practicable, preferably omitting the support 20 and resting directly upon the upper surface of layer 13. Finally, there is provided a source of converting radiation (not shown) for uniformly illuminating the photographic transparency to provide the desired pattern of radiation upon layer 13, as diagrammatically illustrated at 30, the preferred source being a tungsten filament lamp that emits white light and ultraviolet light at an intensity of approximately 300 watts. Alternatively, the desired pattern of radiation may be produced upon layer 13 by projection.

From FIGURE 1 it will be seen that the photographic negative 25 serves to modulate the converting radiation 30, i.e., the opaque areas 26 block the radiation 30, whereas the transparent areas 27 permit passage of the radiation 30 therethrough to impinge upon the reactive layer 13. The reactive layer 13 is normally a dark blue color due to the presence of the indophenol blue therein. In the form of the invention illustrated, when the converting radiation 30 strikes the reactive layer 13, the iodoform reacts in response thereto to form a substance which is chemically reactive with the indophenol blue to cause it to bleach to a colorless state, and with the image-forming layer 12. For any given exposure, the amount of the reactive substance so formed in a given area is proportional to the intensity of the light received by that area of the reactive layer 13. Hence, areas of layer 13 illuminated by light passing through areas of the transparency or negative 25 which are more transparent relative to other areas will receive more of the converting radiation and a greater amount of the reactive substance will be produced in such areas of higher illumination while areas of lower illumination will produce proportionately lesser amounts of the reactive substance. It will thus be seen that the pattern of converting radiation produces an image pattern of the reactive substance in layer 13 which has a point-to-point correspondence with the pattern of radiation as well as a density or concentration correspondence to the variations in intensity of the radiation pattern. The length of time necessary for exposure to the converting radiation is not particularly critical but may vary depending upon a number of factors, such as the thickness of the photomasking layer 13, its composition, the intensity of the converting radiation, and the relative transparency of the photographic negative or transparency, among others. As will be discussed later, the length of exposure time may be of short enough duration that no visible bleaching of the photomasking agent is observable and yet be effective upon subsequent exposure to the activating radiation to produce an image in the image-forming layer 12. On the other hand, the exposure time may be extended long enough to produce a substantially complete bleaching of areas in the reactive layer which are exposed to the highest levels of radiation without damaging the resulting image. The continued exposure beyond this point will cause the reactive substance to react with the image-forming layer in the manner set forth in the previously referenced patent application S.N. 275,753 (now Patent No. 3,346,384, granted Oct. 10, 1967). As previously pointed out, such lengthy exposure times are undesirable at the high levels of radiation employed because of resulting damage to or destruction of the photographic transparencies or negatives used.

After exposure of the reproduction member 10 to the pattern of converting radiation 30 as shown in FIGURE 1, the member 10, bearing within layer 13 a pattern of the reactive substance produced by the radiation's effect on the photolytic material contained therein, is uniformly exposed to activating infrared radiation as shown in FIGURE 2. This may be accomplished by using a conventional infrared lamp, for example, or by heating in an oven. During the exposure to the activating radiation, substantially no further reaction occurs between the radiant energy and the unreacted reactive material in layer 13, but the reactive substance comprising the image pattern formed during the exposure step by the reaction between the converting radiation and the reactive material reacts with the photomasking material in layer 13 to bleach it to a condition in which it is transparent, as shown at 15, to the activating radiation, the degree of transparency of any given area being related to the concentration of the reactive substance contained in that area, the areas which have not been exposed to the converting radiation being opaque as at 17. Additionally, the reactive substance in layer 13 reacts with the image forming film 12 to form a halogen compound image pattern 14 in the surface of film 12 which forms an interface with layer 13. As illustrated in FIGURE 2, the exposure to the activating radiation may be terminated before the reaction is permitted to progress completely through the image forming film 12, or it may not, as shown in FIGURE 3.

After the image pattern of halogen compound has been formed, the photomasking layer 13 may then be removed by the application of a solvent 51 from a source 50 as shown in FIGURE 3. The solvent used may or may not be effective to remove the image pattern formed by the halogen compound areas 14 from the unreacted pattern formed by the remaining portions 16 of the image-forming film 12. If it is desired to remove the areas 14 to leave a relief image, an image pattern 16 results as shown in FIGURE 4 which is the reverse of the pattern of converting radiation initially applied.

While for purposes of illustration, each of the transparent areas 27 in the photographic transparency 25 have been shown to be of equal density, it will be appreciated that these areas may be of unequal densities and that such different densities are producible in the resulting image. It should also be appreciated that it may be desirable to retain layer 13 upon member 10 rather than removing it. In this case, the image pattern in layer 13 may be stabilized or "fixed" by removing the photolytic agent such as iodoform from layer 13 by continued heating or by vacuum treatment after the halogen image pattern 14 has been formed in film 12.

A first preferred embodiment of the reproduction member 10 and the method of making the same will now be described in detail.

EXAMPLE 1

The support 11 is formed of glass, and for the sake of convenience is a microscope slide, at least the surface of the support 11 that is to be coated with the metal film being carefully cleaned. In the cleaning process, a detergent is first utilized to remove any dirt film, followed by a rinse in distilled water after which the surface is etched with an ammonium bifluoride solution, the surface again rinsed in distilled water and finally rinsed in acetone. A tin film 12 approximately 200 angstrom thick was then vapor deposited upon the cleaned surface of the glass support 11. A coating solution for forming the reactive layer 13 was then made having the following composition:

| | Grams |
|---|---|
| Polystyrene resin solids | 1.2 |
| Benzene | 4.8 |
| Acetone | 1.5 |
| Iodoform | 0.35 |
| Indophenol blue | 0.035 |

The coating solution was cast upon the metal film 11 and the solvents were removed by heating for five minutes at 80° C. There resulted a reactive layer 13 of polystyrene resin having a thickness of about 25 microns and having incorporated therein approximately 22.1 percent by weight iodoform and 2.2 percent by weight indophenol blue.

The polystyrene in the coating composition had an average molecular weight of approximately 20,000 and a softening temperature, i.e., reached the plastic condition, at a temperature of about 80° C. The thickness of the reactive layer 13 is preferably in the range from about 5 microns to about 100 microns, a minimum thickness of 5 microns being required to provide a well defined etching in the metal film 11 by providing sufficient reactants therefor, while a reactive layer 13 thicker than about 100 microns substantially reduces the resolution of the image etched upon the metal film 11.

The iodoform in Example 1 is a photoionizable agent that is characterized by the production of a chemically reactive substance when exposed to converting radiation, such as light from a tungsten filament lamp source. Lesser concentrations of the iodoform may be utilized in the reactive layer 13, but the sensitivity of the reactive layer 13 is correspondingly reduced, although for thinner metal films 12, somewhat lower concentrations may be desirable; somewhat higher concentrations of the iodoform in the reactive layer 13 may also be used, and particularly when thicker metal films 12 are used. However, it is not desirable to employ amounts of iodoform in excess of its limits of solubility in the coating composition. It has been found that the preferred range in grams of the iodoform in the coating composition of Example 1 is from about 0.2 gram to about 0.4 gram.

The concentration of the indophenol blue in the coating composition of Example 1 also can be varied in a range from about 0.015 gram to about 0.07 gram in the composition. The lower limit of the concentration of the dye is determined by that amount required to render the resultant reactive layer 13 essentially opaque to the activating infrared radiation, while the upper limit of the concentration of the dye is such that those areas of layer 13 which receive the highest levels of illumination during the exposure step will be bleached to a substantially transparent condition during the exposure to the activating radiation.

The benzene and the acetone serve as solvents, the benzene serving as a solvent for the polystyrene resin and for the iodoform, while the acetone has a slight oxidizing action on the tin film 12 to give increased adhesion of the layer 13 thereto. The amount of benzene in the coating solution of Example 1 could be varied from as little as about 2 grams to as much as 10 grams or more, the lower limit being determined by the solubility of the polystyrene resin and the iodoform in the solution. The upper limit is determined by the desired viscosity of the coating solution during the casting thereof. The amount of acetone utilized in the coating composition of Example 1 can also be varied from about 0.5 gram to about 5.0 grams, problems in casting the layer 13 having been encountered if an amount greater than 5 grams of acetone is incorporated in the coating solution of Example 1. Other suitable solvents can be used in place of the benzene, such for example as toluene, xylene, methyl ethyl ketone, or tetrahydrofuran, the latter solvents being substituted either in part or entirely therefor, while methyl ethyl ketone may be used in place of all or part of the acetone in the coating solution of Example 1.

The recording member 10 prepared as in Example 1 above was employed to record an image contained on the photograph negative 25 by projecting the image onto the reactive layer 13 with an ordinary 300 watt slide projector utilizing a tungsten filament for an exposure time of 10 minutes. There resulted a bleaching in the areas 15 of the reactive layer 13 exposed to the converting radiation 30, the iodoform exposed to the radiation reacting with the indophenol blue to cause a change thereof from a dark or masking condition as originally provided in the reactive layer 13 to a bleached or colorless non-masking condition in the areas exposed to the converting radiation 30. The iodoform further is a photolytic agent which liberates a reactive substance that reacts with the adjacent surface of the tin film 12 to form tin iodite compounds as at 14. After exposure for 10 minutes to the converting radiation 30, the photographic negative 25 and the glass support 20 were removed and the surface of the reactive layer 13 was flooded with a uniform infrared radiation from a 250 watt source disposed approximately 4 inches from the surface thereof.

During the exposure to the activating infrared radiation, a further reaction occurred at the interface between the tin film 12 and layer 13 in those areas which had been bleached, in which the tin was converted to tin iodide.

After about 30 minutes of exposure, the tin was found to have been completely reacted in those portions of the film which were in registry with the bleached or transparent areas of layer 13 and there was no observable bleaching in those areas of layer 13 which had not been exposed to the converting radiation.

A solvent mixture of benzene and acetone was then applied to the surface of the reproduction member 10 from the source 50, the solvent mixture dissolving away both the reactive layer 13 and the reacted tin iodide compounds at 14, thereby leaving the unreacted tin areas 16 exposed to the atmosphere and supported upon the glass support 11. The resultant reproduction may be observed directly by reflected or by transmitted light, or may serve as a printing block by applying ink to the upper surfaces of the areas 16 or may be utilized as a portion of a printed electrical circuit, all as is well known in the art and as has been described in the aforementioned application Ser. No. 275,753 (now Patent No. 3,346,384, granted Oct. 10, 1967).

A careful examination of the remaining portions 16 of the tin layer revealed substantially no lateral attack or undercutting in the areas of removal of the tin metal therebetween; more specifically, the edges of the retained metal areas 16 were sharp and comparison thereof with the photographic negative revealed that sharp line definition and excellent dimensional tolerances were obtained in the record as represented by the retained metal areas 16.

The following is an example of another organic dye useful in the present invention in place of the indophenol blue utilized in Example 1 above.

EXAMPLE 2

A reproduction member 10 was made utilizing the process set forth in Example 1 above and utilizing the coating solution described therein but modified to replace the indophenol blue with 0.035 gram of Sudan Black B, a dye having the following structural formula:

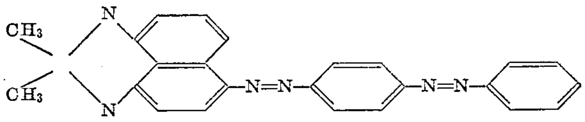

The resultant reproduction member had a reactive layer 13 that was dark blue in color and which was essentially opaque to infrared activating radiation. Exposure of the recording member 10 to the converting radiation from a tungsten filament lamp source served to bleach the areas struck by the converting radiation and an image pattern of tin iodide was formed upon exposure to the infrared activating radiation. Accordingly, the reproduction member was useful in the same manner as the reproduction member 10 of Example 1 above.

Other photolytic agents may be used in the present invention in place of the iodoform illustrated in Examples 1 and 2 above. A large number of halogenated hydrocarbons, and particularly polyhalogenated hydrocarbons, are useful, the preferred compounds being those polyhalogenated organic compounds in which the carbon atom to which the halogen is attached has no more than two hydrogen atoms attached thereto and preferably only one hydrogen atom attached thereto. Also, the higher halogens, i.e., chlorine, bromine, and iodine are preferred. The following is an example of another short chain aliphatic polyhalogenated hydrocarbon useful as a photolytic agent in the present invention.

EXAMPLE 3

A reproduction member like the reproduction member 10 of Example 1 was formed but in place of the iodoform there was substituted 0.35 gram of carbon tetrabromide. The resultant reproduction member was processed in accordance with Example 1 and was found to be useful in the same manner as the reproduction member 10 made in accordance with Example 1.

EXAMPLE 4

A reproduction member was made in accordance with Example 1 above, but there was substituted for the iodoform 0.35 gram of trichloromethylsulfonyl chloride, and there was substituted 0.6 gram of xylene for a like weight of benzene. The resultant reproduction member was processed in accordance with Example 1 and was found to be entirely useful in the same manner as the reproduction member made in accordance with Example 1.

The following is an example of a polyhalogenated aromatic hydrocarbon also useful as a photolytic agent in the present invention.

EXAMPLE 5

A reproduction member was made in accordance with Example 1, but substituting 0.035 gram of chloranil (2,3,5,6-tetrachloro-1,4-benzoquinone) for the iodoform therein and substituting 0.7 gram of toluene for a like amount of benzene. The resultant reproduction member was processed in accordance with the Example 1 and was found to be entirely useful in the same manner as the reproduction member 10 made in accordance with Example 1.

In each of Examples 1 to 5 above, the support 11 has been rigid, i.e., formed of glass; the following is another preferred form of the reproduction member 10 wherein the support is formed of a flexible material, such as a flexible thermoplastic resin.

EXAMPLE 6

A reproduction member was made utilizing as the support 11 a thermoplastic resin which reaches the plastic condition at a relatively high temperature, whereby to withstand the application of the infrared radiation thereto in the processing of the reproduction member, the material used being commercially available transparent polyethylene terephthalate film or tape having a thickness of about 4 mils. The tin film 12 was deposited upon the surface of the plastic tape and the reactive layer applied as described in detail above in Example 1. The resultant reproduction member was processed in accordance with Example 1 and it was found to perform as well as the reproduction member 10 made in accordance with Example 1.

Furthermore, the reproduction member 10 of Example 6 has a flexibility such as to accommodate winding thereof around small diameter mandrels, i.e., mandrels having a diameter of about ⅜ inch, which is the usual requirement for conventional projection machines. The flexible support of Example 6 may have a thickness in the range from about 0.5 mil to about 6 mils and still have the desirable strength and flexibility.

Other synthetic organic resins may be used in the place of the resin described above in Example 6 for forming the flexible transparent support 11; the resins used in forming the support 11 may be thermoplastic in character provided that the temperature at which the thermoplastic resin reaches the plastic state is substantially above the temperatures to which the reproduction member is subjected. The preferred resins for the support 11 are the heat resistant compositions, such as aromatic polyester resins or polyamide resins that reach a plastic condition above 150° C. or higher such as, for instance, those described in the Journal of Polymer Science, vol. 40, pp. 289 and 418, November 1959, although resin compositions having even higher softening temperatures are within the scope of the invention. If the member 10 is to be transparent, it is necessary that the resin of the support 11 be an optically clear material. Suitable compositions in addition to those mentioned above are acetal resins, silicone resins and polycarbonate resins.

The image-forming film 12 is preferably a metal, tin having been given as an example of a suitable metal useful in the present invention. A large number of metals are useful in addition to tin, and including silver, copper, lead, iron, zinc, and aluminum. The following are additional specific examples of reproduction members utilizing metals other than tin in the film 12.

EXAMPLE 7

A reproduction member was made utilizing the process of Example 1 above, but silver was substituted for tin in the film 12, the silver being vapor deposited upon the glass support 11 to a thickness of approximately 950 angstroms in an ordinary vacuum coater. The resultant reproduction member was utilized to record in accordance with Example 1, a benzene solution being utilized to remove the reactive resin layer 13. The benzene solution is not effective as a solvent for silver iodide. If it is desired to dissolve the silver iodide salts, a 10 percent aqueous solution of sodium thiosulfate is utilized. The reproduction member made in accordance with Example 7 was in every respect useful in the same manner as the reproduction member described above with respect to Example 1.

When it is desired to form an electrical circuit pattern in the metal film 12, copper may be preferred as the metal. The following is an example of a reproduction member utilizing copper in the metal film 12.

EXAMPLE 8

A reproduction member was made in accordance with Example 1, but substituting copper in the metal film 12, a copper film approximately 500 angstroms thick being vapor deposited on support 11. The resultant reproduction member was utilized to produce in the copper film an image from a photographic negative, all in accordance with Example 1. If it is desired to leave the copper iodide reaction products in place, the reactive layer 13 can be removed by dissolving in benzene. However, should it be desired also to remove the copper iodide reaction products, they can be removed using a 10 percent aqueous solution of potassium iodide. The reproduction member made in accordance with Example 8 has all of the desirable characteristics pointed out above with regard to the reproduction member made in accordance with Example 1.

In each of the Examples 1 to 8 above, the reactive layers 13 are formed essentially of a polystyrene resin that is a solid at ambient conditions, all as has been discussed above in detail with respect to Example 1. Other suitable resin compositions that are solids at ambient conditions may be used for the reactive layer 13 in place of the polystyrene resin illustrated above. In general, resin compositions useful in the reactive layer 13 must be solvents for or capable of having dispersed therein both the photolytic agent and the photomasking agent. Other important physical and rheological properties for the reactive layer 13 useful in the construction of continuous recording members include adhesion of the reactive layer 13 to the substrate, i.e., to the film 12, and a surface characteristic such as to prevent sticking between successive layers of the recording member during storage in a rolled configuration thereof. Suitable resins having all of the desirable characteristics may be selected from the general class including acetal resins, acrylic resins, polyester resins, silicone resins and vinyl resins. Mixtures of resins are also useful such as a composition comprising 90 parts by weight of polydiphenyl siloxane resin and 10 parts by weight of poly(2,6-dimethyl-1,4-phenylene) ether; another useful composition comprises 70 parts by weight of the polystyrene resin of Example 1, two parts by weight of n-terphenyl and 28 parts by weight of a butadiene-styrene copolymer (95 percent butadiene and 5 percent styrene).

In each of Examples 1 to 8 above, the reactive layer 13 has been a solid at ambient conditions, and specifically at ambient temperatures. In accordance with the present invention the layer 13 may also be a liquid, the liquid preferably being relatively viscous under the conditions encountered during processing of the recording member, thereby to limit the migration between the opaque and transparent areas or zones in the reactive layer 13 during the final exposure with the infrared radiation. One preferred class of liquids for forming the layer 13 are low molecular weight thermoplastic resins. For example, a polystyrene resin having a molecular weight of approximately 5,000 is useful. Also useful are the liquid silicone resins such as those sold by the General Electric Company under the designation "SF–96," "SF–85," and "SF–97," as well as organopolysiloxane fluids sold under the trademark "Viscasil." The liquid phenyl oxides, such as diphenyl oxide, are useful as well as dioctyl phthalate. In fact any liquid which is inert with respect to the reactions involved may be utilized in the layer 13 into which a suitable quantity of photolytic agent and photomasking agent can be incorporated, all without loss of the bleached zones therein during the final exposure to the activating infrared radiation.

In all the foregoing examples, the image reproduction has involved an exposure of the reactive layer 13 to the converting radiation for a period of time, specifically ten minutes in Example 1, sufficient to produce a bleaching reaction which extends substantially through the reactive layer 13 in areas of highest illumination. It has been found that considerably shorter periods of exposure may be employed. For example, a reproduction member made in accordance with the disclosure of Example 1 was exposed to an image pattern of converting radiation as disclosed in Example 1 for a period of two minutes instead of ten. At the end of the two minutes, no visible bleaching had occurred in the reactive layer, but after exposure to the infrared activating radiation in accordance with the procedure set forth with respect to Example 1, an image pattern of bleached areas were found to have formed in layer 13 and a pattern of tin iodide corresponding to the bleached areas had formed in film 12, which bleached areas are tin iodide pattern were substantially indistingiushable from those formed in Example 1. Furthermore, when the procedure set forth in Example 1 was repeated utilizing a reactive layer 13 in which the indophenol blue was omitted, it was found that the image pattern sought to be reproduced was destroyed during the exposure to the activating radiation by a reaction between the reactive layer 13 and areas of the tin film which had not been illuminated during the exposure step.

From the foregoing, it appears that a photolytic reaction of some kind takes place between the photolytic material and the dye in layer 13 in response to the converting radiation which results in a bleaching action on the dye. It also appears that no such reaction occurs in response to exposure to the activating radiation, although latent bleaching may occur. Further, that while the activating radiation produces a photolytic reaction between the photolytic material in the reactive layer and the image-forming film, the chemically reactive substance formed in response to the activating radiation is not reactive with the dye. Whether the photolytic reaction which takes place in response to the converting radiation is essentially the same as the reaction which takes place in response to the activating radiation, or is of a completely different nature is not known at this time and hence, no attempt is herein made to explain the phenomena which have been observed and previously described.

While visible light from a tungsten filament source has been illustrated as being the preferred converting radiation, it will be understood that other sources of visible light may be utilized and that other activating radiation, and particularly ultraviolet light may be utilized herein.

From the above it will be seen that there have been provided a reproduction method and system and a reproduction member therefor which fulfill all of the objects and advantages set forth previously. More specifically, there has been provided an improved reproduction method and system of the type set forth wherein the exposure time is materially reduced and wherein the need for exposing the modulating medium, such as a photographic transparency to long periods of potentially damaging radiation is substantially reduced. There further has been provided an improved reproduction member for use in a reproduction method and system.

While there have been described what are at present considered to be the preferred embodiments of the invention, it will be understood that various modifications may be made therein, and it is intended to cover in the appended claims all such modifications as fall within the true spirit and scope of the invention.

What we claim as new and desire to secure by Letters Patent of the United States is:

1. The method of reproducing an image comprising the steps of providing a metal surface and a reactive layer supported thereon, said layer having incorporated therein a polyhalogenated organic compound and a bleachable organic dye, said polyhalogenated organic compound being responsive to activating radiation to produce a substance which is chemically reactive with said metal surface, said bleachable organic dye being convertible from a masking condition to a non-masking condition in response to exposure of said layer to converting radiation and when in the masking condition able to prevent the photolytic formation of said chemically reactive substance, exposing said layer to a selective pattern of said converting radiation to convert the bleachable organic dye to the non-masking condition in illuminated areas of said selective pattern, and subsequently exposing said layer to said activating radiation of wavelength different from the wavelength of the converting radiation to produce said chemically reactive substance in said previously illuminated areas which substance reacts with said metal surface to reproduce a design pattern of reaction product therein having a point-to-point correspondence to said selective pattern of converting radiation.

2. The method of claim 1 wherein said metal surface is supported by a thermally stable substrate.

3. The method of claim 2 wherein said substrate is transparent.

4. The method of claim 1 wherein said photolytic material is a halogenated hydrocarbon.

5. The method of claim 1 wherein said converting radiation is light in the visible and ultraviolet range.

6. The method of claim 1 wherein said activating radiation is infrared.

7. The method of claim 1 wherein said polyhalogenated organic compound is volatilizable and said design pattern is fixed by heating said reactive layer to drive out unreacted polyhalogenated organic compound therefrom.

8. The method of claim 1 wherein said reactive layer is removed from said metal surface after said design pattern of reaction product has been formed therein.

9. The method of claim 8 wherein said reaction product is removed from said metal surface.

References Cited

UNITED STATES PATENTS

| | | | |
|---|---|---|---|
| 3,154,416 | 10/1964 | Fidelman | 96—18 XR |
| 3,346,384 | 10/1967 | Gaynor | 96—36.2 XR |
| 3,305,361 | 2/1967 | Gaynor et al. | 96—89 X |

GEORGE F. LESMES, Primary Examiner

R. E. MARTIN, Assistant Examiner

U.S. Cl. X.R.

90—36.2